US010671545B2

(12) United States Patent
Tarasuk-Levin et al.

(10) Patent No.: US 10,671,545 B2
(45) Date of Patent: Jun. 2, 2020

(54) ASYNCHRONOUS ENCRYPTION AND DECRYPTION OF VIRTUAL MACHINE MEMORY FOR LIVE MIGRATION

(71) Applicant: VMware, Inc., Palo Alto, CA (US)

(72) Inventors: Gabriel Tarasuk-Levin, San Jose, CA (US); Reilly Grant, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 427 days.

(21) Appl. No.: 14/752,635

(22) Filed: Jun. 26, 2015

(65) Prior Publication Data

US 2015/0381589 A1 Dec. 31, 2015

Related U.S. Application Data

(63) Continuation-in-part of application No. 14/587,980, filed on Dec. 31, 2014, and a continuation-in-part of application No. 14/587,826, filed on Dec. 31, 2014, and a continuation-in-part of application No. 14/588,023, filed on Dec. 31, 2014.

(60) Provisional application No. 62/146,180, filed on Apr. 10, 2015, provisional application No. 62/018,582, filed on Jun. 28, 2014, provisional application No. 62/041,047, filed on Aug. 23, 2014, provisional application No. 62/041,626, filed on Aug. 25, 2014, provisional application No. 62/018,580, filed on Jun. 28, 2014.

(51) Int. Cl.
*G06F 12/14* (2006.01)
*H04L 29/06* (2006.01)
*G06F 9/455* (2018.01)

(52) U.S. Cl.
CPC ...... *G06F 12/1408* (2013.01); *G06F 9/45558* (2013.01); *H04L 63/0428* (2013.01); *G06F 2009/4557* (2013.01); *G06F 2009/45587* (2013.01)

(58) Field of Classification Search
CPC .................... G06F 12/1408; H04L 63/0428
USPC .......................................... 713/193
See application file for complete search history.

(56) References Cited

U.S. PATENT DOCUMENTS

| 5,832,484 | A | 11/1998 | Sankaran |
|---|---|---|---|
| 7,680,919 | B2 | 3/2010 | Nelson |
| 8,335,899 | B1 | 12/2012 | Meiri |
| 8,402,200 | B2 | 3/2013 | Hwang |
| 8,407,182 | B1 | 3/2013 | Rajaa |

(Continued)

OTHER PUBLICATIONS

Chavis, John Q., "Office Action", U.S. Appl. No. 14/588,023, dated Feb. 2, 2016, 6 pages.

(Continued)

*Primary Examiner* — Teshome Hailu

(57) ABSTRACT

Examples perform asynchronous encrypted live migration of virtual machines (VM) from a source host to a destination host. The encryption of the memory blocks of the VM is performed optionally before a request for live migration is received or after said request. The more resource intensive decryption of the memory blocks of the VM is performed by the destination host in a resource efficient manner, reducing the downtime apparent to users. Some examples contemplate decrypting memory blocks of the transmitted VM on-demand and opportunistically, according to a pre-determined rate, or in accordance with parameters established by a user.

20 Claims, 8 Drawing Sheets

(56) References Cited

U.S. PATENT DOCUMENTS

| | | |
|---|---|---|
| 8,527,990 B1 | 9/2013 | Marathe |
| 8,875,134 B1 | 10/2014 | van der Goot |
| 8,954,408 B2 | 2/2015 | Dudgeon |
| 8,966,211 B1 | 2/2015 | Arnon |
| 9,043,640 B1 | 5/2015 | Havemose |
| 9,081,842 B1 | 5/2015 | Natanzon |
| 9,201,802 B1 | 12/2015 | Armangau |
| 9,201,887 B1 | 12/2015 | Earl |
| 9,251,004 B1 | 2/2016 | Havermose |
| 2004/0047466 A1* | 3/2004 | Feldman ............... H04L 9/0631 380/37 |
| 2004/0247295 A1* | 12/2004 | Nam ...................... H04N 5/913 386/259 |
| 2005/0289143 A1 | 12/2005 | Oshri |
| 2007/0168284 A1* | 7/2007 | Factor ................ G06F 21/6218 705/50 |
| 2008/0065902 A1* | 3/2008 | Spohrer ............. H04L 63/0428 713/193 |
| 2008/0127182 A1 | 5/2008 | Newport |
| 2008/0137837 A1* | 6/2008 | Patel .................... H04L 9/0637 380/28 |
| 2009/0063751 A1 | 3/2009 | Dow |
| 2009/0113151 A1 | 4/2009 | Teranishi |
| 2010/0064144 A1* | 3/2010 | Kaabouch ............... G06F 21/85 713/190 |
| 2010/0281273 A1* | 11/2010 | Lee ........................ G06F 21/72 713/190 |
| 2011/0099318 A1 | 4/2011 | Hudzia |
| 2011/0321041 A1 | 12/2011 | Bhat |
| 2012/0233285 A1 | 9/2012 | Suzuki |
| 2012/0284234 A1 | 11/2012 | Mashtizadeh |
| 2012/0284707 A1 | 11/2012 | Jankiraman |
| 2013/0031069 A1 | 1/2013 | Dudgeon |
| 2013/0042241 A1 | 2/2013 | Lorenc |
| 2013/0091571 A1* | 4/2013 | Lu ........................ G06F 21/563 726/23 |
| 2013/0247020 A1 | 9/2013 | Fontignie et al. |
| 2013/0262801 A1 | 10/2013 | Sancheti |
| 2013/0290661 A1 | 10/2013 | Reuther |
| 2014/0068127 A1 | 3/2014 | Baron |
| 2014/0115161 A1 | 4/2014 | Agarwal |
| 2014/0136803 A1 | 5/2014 | Qin |
| 2014/0189672 A1 | 7/2014 | Raundahl |
| 2014/0229697 A1 | 8/2014 | Colbert |
| 2014/0282536 A1 | 9/2014 | Dave |
| 2014/0310800 A1 | 10/2014 | Kabra |
| 2014/0344395 A1 | 11/2014 | Alexander |
| 2015/0074453 A1 | 3/2015 | Fleming et al. |
| 2015/0178108 A1 | 6/2015 | Tarasuk-Levin |
| 2015/0178109 A1 | 6/2015 | Li |
| 2015/0378831 A1 | 6/2015 | Tarasuk-Levin |
| 2015/0205542 A1 | 7/2015 | Antony |
| 2015/0212839 A1* | 7/2015 | Tsirkin ................ G06F 3/0647 711/161 |
| 2015/0254424 A1 | 9/2015 | Guay |
| 2015/0278041 A1 | 10/2015 | Ganesan |
| 2015/0370660 A1 | 12/2015 | Pershin |
| 2015/0381723 A1 | 12/2015 | Sancheti |
| 2016/0055019 A1 | 2/2016 | Thakkar |
| 2016/0105378 A1 | 4/2016 | Xia |
| 2016/0110267 A1 | 4/2016 | Earl |
| 2016/0224371 A1 | 4/2016 | Ramanathan |
| 2016/0191332 A1 | 6/2016 | Markley et al. |

OTHER PUBLICATIONS

Chavis, John Q., "Office Action", U.S. Appl. No. 14/587,980, dated Jan. 15, 2016, 8 pages.

Chavis, John Q., "Office Action", U.S. Appl. No. 14/587,980, dated Jun. 27, 2016, 9 pages.

Lui et al., "Live Virtual Machine Migration via Asynchronous Replication and State Synchronization", Dec. 2011, 14 pages.

Chavis, John Q., "Office Action", U.S. Appl. No. 14/752,643, dated Jul. 5, 2016, 17 pages.

Chavis, John Q., "Office Action", U.S. Appl. No. 14/587,826, dated Jan. 13, 2016, 9 pages.

Chavis, John Q., "Office Action", U.S. Appl. No. 14/752,668, dated Jul. 28, 2016, 14 pages.

Do, Stephen M., "Office Action", U.S. Appl. No. 14/752,652, dated Sep. 1, 2016, 33 pages.

Chavis, John Q., "Notice of Allowance", U.S. Appl. No. 14/752,674, dated Jul. 20, 2016, 14 pages.

Chavis, John Q., "Office Action", U.S. Appl. No. 14/752,668, dated Jan. 12, 2017, 26 pages.

Chavis, John Q., "Notice of Allowance", U.S. Appl. No. 14/752,674, dated Jan. 31, 2017, 13 pages.

Chavis, John Q., "Notice of Allowance", U.S. Appl. No. 14/587,826, dated Dec. 21, 2016, 19 pages.

* cited by examiner

ASYNCHRONOUS ENCRYPTION AND DECRYPTION OF VIRTUAL MACHINE MEMORY FOR LIVE MIGRATION

CROSS-REFERENCE TO RELATED APPLICATIONS

This application claims the benefit of U.S. Provisional Patent Application Ser. No. 62/146,180, filed Apr. 10, 2015 entitled "Asynchronous Encryption and Decryption During Live Migration", U.S. Provisional Patent Application Ser. No. 62/018,582, filed Jun. 28, 2014 entitled "Live Migration with Pre-Opened Shared Disks", U.S. Provisional Patent Application Ser. No. 62/041,047, filed Aug. 23, 2014 entitled "Live Migration of Virtual Machines with Memory State Sharing", U.S. Provisional Patent Application Ser. No. 62/041,626, filed Aug. 23, 2014 entitled "Using Active/Passive Replicated Storage for Live Migration", and U.S. Provisional Patent Application Ser. No. 62/018,580, filed Jun. 28, 2014 entitled "Using Active/Active Asynchronous Replicated Storage for Live Migration", all of which are incorporated by reference herein in their entireties.

This application is a continuation-in-part of U.S. patent application Ser. No. 14/587,980, filed Dec. 21, 2014 entitled "Live Migration with Pre-Opened Shared Disks", U.S. patent application Ser. No. 14/587,826, filed Mar. 25, 2015 entitled "Live Migration of Virtual Machines with Memory State Sharing", and U.S. patent application Ser. No. 14/588,023, filed Dec. 31, 2014 entitled "Using Active/Active Asynchronous Replicated Storage for Live Migration", all of which are incorporated by reference herein in their entireties.

This application is related to commonly-owned U.S. Non-Provisional Patent Applications entitled "Using Active/Passive Asynchronous Replicated Storage for Live Migration", "Using a Delta Query to Seed Live Migration", "Maintaining Consistency Using Reverse Replication During Live Migration", and "Using a Recovery Snapshot During Live Migration", filed concurrently herewith, all of which are incorporated by reference herein in their entireties.

BACKGROUND

Live migration programs, such as vMotion from VMware, Inc., migrate a memory state of a source host computing device to a destination host computing device. Receiving the memory state is relatively expensive in terms of bandwidth and resources consumed and, for at least some migration programs, acts as a bottleneck. For example, at least some live migration programs consume approximately one processor core worth of cycles to handle receiving pages at 10 gigabits.

Moreover, at least some users, particularly government users, implement end-to-end encryption of live migration traffic. At least some encryption schemes encrypt and/or decrypt page content as a synchronous component of a transmit path and/or a receipt path. Accordingly, at least some encryption schemes increase the bandwidth and/or resources consumed on at least the receipt path, impacting a performance of the live migration.

SUMMARY

One or more examples described herein enable rapid encrypted live migration of virtual machines (VMs) using asynchronous encryption and decryption. Memory blocks are encrypted by a source VM and transmitted to a destination VM. The destination VM decrypts the memory blocks asynchronously, on-demand and opportunistically. In some examples the memory blocks are decrypted only as needed by the user. In other examples the memory blocks are decrypted in the background, using idle processing resources.

This summary introduces a selection of concepts that are described in more detail below. This summary is not intended to identify essential features, nor is it to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Aspects of the disclosure present a live migration scheme that accommodates virtual machines (VMs) having numerous disks representing large quantities of memory blocks, including random access memory (RAM) memory blocks. In some examples, encrypted RAM memory blocks are efficiently decrypted to reduce and/or control a switchover time associated with the live migration of a source host computing device to a destination host computing device. For example aspects of the disclosure enable the destination host computing device to perform one or more decryption operations based on one or more user-identified parameters or criteria, which effectively moves expensive decryption operations to outside the receipt path. One or more encryption and/or decryption operations may be scheduled and/or performed at times that are efficiently and/or convenient in terms of processor resources.

The asynchronous encrypted live migration described herein improves the functioning of VMs, and provides secure continuity of service as a VM is migrated from one host to another. Further, VM downtime (or unavailability) is decreased during the live migration by efficiently managing the destination host computing device. In some examples, there is little to no noticeable delay for users in accessing the VM, thereby improving the human-machine interface experience.

Examples of the asynchronous encrypted live migration process are described as follows, although variations in the operations to achieve similar results are within the scope of the disclosure. Further, while the operations are sequentially ordered in the figures (e.g., FIG. 4), flexibility in the order of execution of the operations is within the scope of the disclosure so long as at least some of the expensive (e.g., time-consuming) decryption operations are removed from the receipt path time window.

Example operations associated with live migration are described in the context of a virtualized environment, such as next described with reference to FIG. 1.

Figure 1:
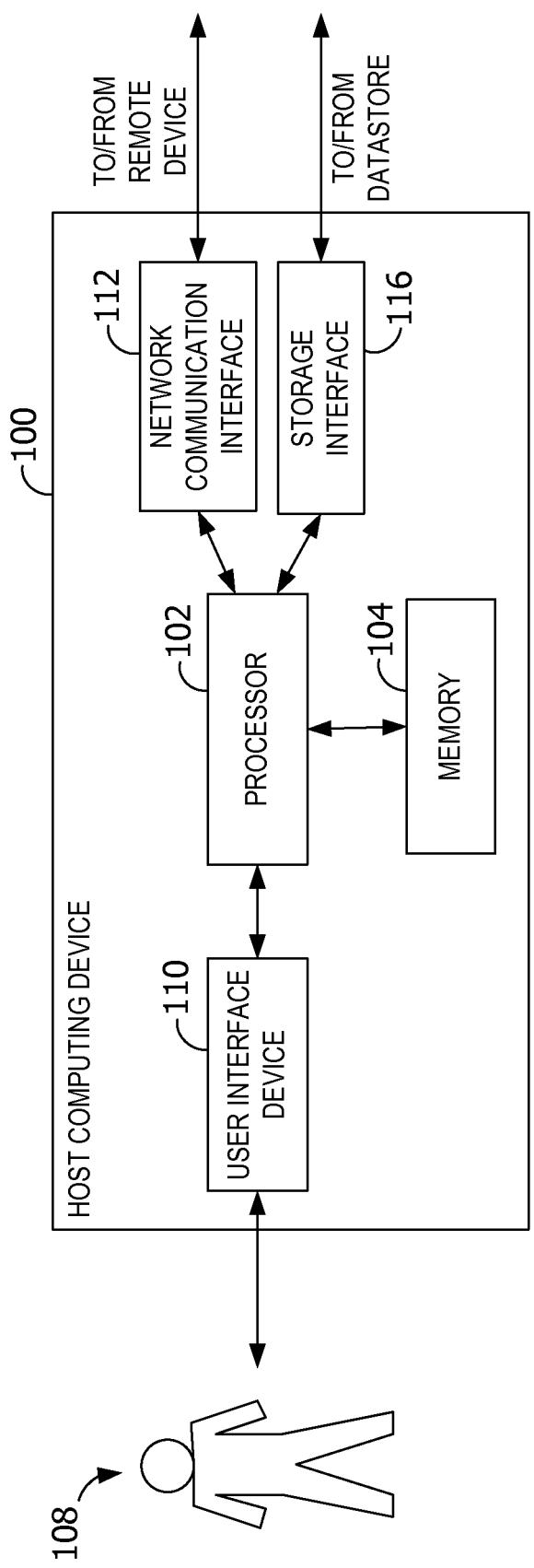
FIG. 1 is a block diagram of an example host computing device.

FIG. 1 is a block diagram of an example host computing device 100. Host computing device 100 includes a processor 102 for executing instructions. In some examples, executable instructions are stored in a memory 104. Memory 104 is any device allowing information, such as executable instructions and/or other data, to be stored and retrieved. For example, memory 104 includes one or more random access memory (RAM) modules, flash memory modules, hard disks, solid-state disks, and/or optical disks. In FIG. 1, memory 104 refers to memory and/or storage. However, in some examples, memory 104 refers only to memory in host computing device 100, and excludes storage units such as disk drives and hard drives. Other definitions of memory are contemplated.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 110 operates to receive data from user 108, while another device (e.g., a presentation device) operates to present data to user 108. In other examples, user interface device 110 has a single component, such as a touch screen, that functions to both output data to user 108 and receive data from user 108. In such examples, user interface device 110 operates as a presentation device for presenting information to user 108. In such examples, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some examples, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In some examples, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
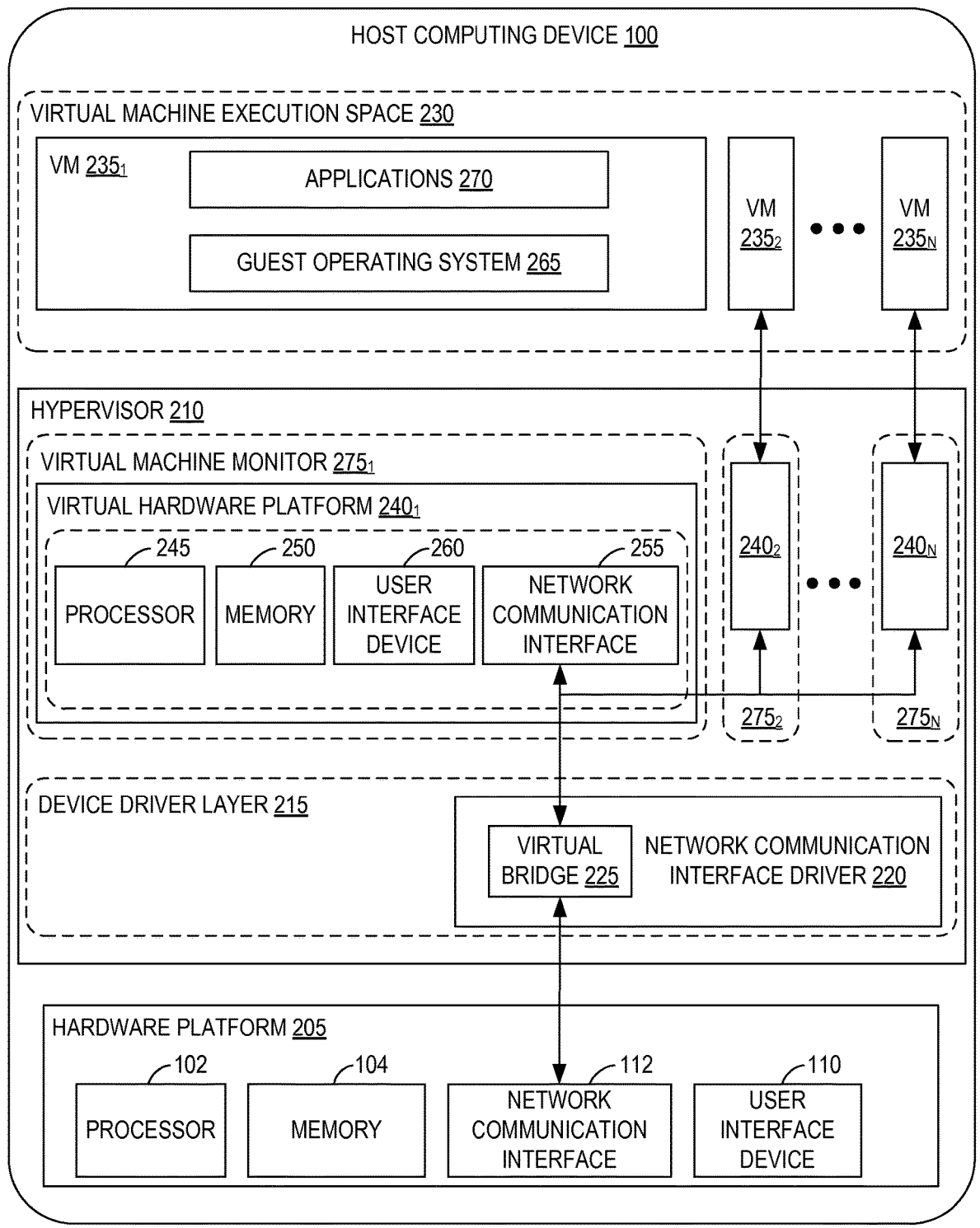
FIG. 2 is a block diagram of example virtual machines that are instantiated on a computing device, such as the host computing device shown in FIG. 1.

FIG. 2 depicts a block diagram of virtual machines $235_1$, $235_2$ ... $235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device. A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some examples, memory 250 in first virtual hardware platform $240_1$ includes a virtual disk that is associated with or "mapped to" one or more virtual disk images stored on a disk (e.g., a hard disk or solid-state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an example, network communication interface 112 is an Ethernet adapter that is configured in "promiscuous mode" such that Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 to execute applications 270 for an instantiated VM, such as first VM $235_1$. Aspects of the disclosure are operable with any computer architecture, including non-x86-compatible processor structures such as those from Acorn RISC (reduced instruction set computing) Machines (ARM), and operating systems other than those identified herein as examples.

Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an example of the disclosure is included as a component in VMware's ESX brand software, which is commercially available from VMware, Inc.

The host computing device 100 may include any computing device or processing unit. For example, the computing device 100 may represent a group of processing units or other computing devices, such as in a cloud computing configuration. The computing device 100 has at least one processor 102 and a memory 104. The processor 102 includes any quantity of processing units, and is programmed to execute computer-executable instructions for implementing aspects of the disclosure. The instructions may be performed by the processor 102 or by multiple processors 102 executing within the computing device 100, or performed by a processor 102 external to the computing device 100. In some examples, the processor 102 is programmed to execute instructions such as those illustrated in the figures.

The memory 104 includes any quantity of computer-readable media associated with or accessible by the computing device 100. The memory 104, or portions thereof, may be internal to the computing device 100, external to the computing device 100, or both.

Figure 3:
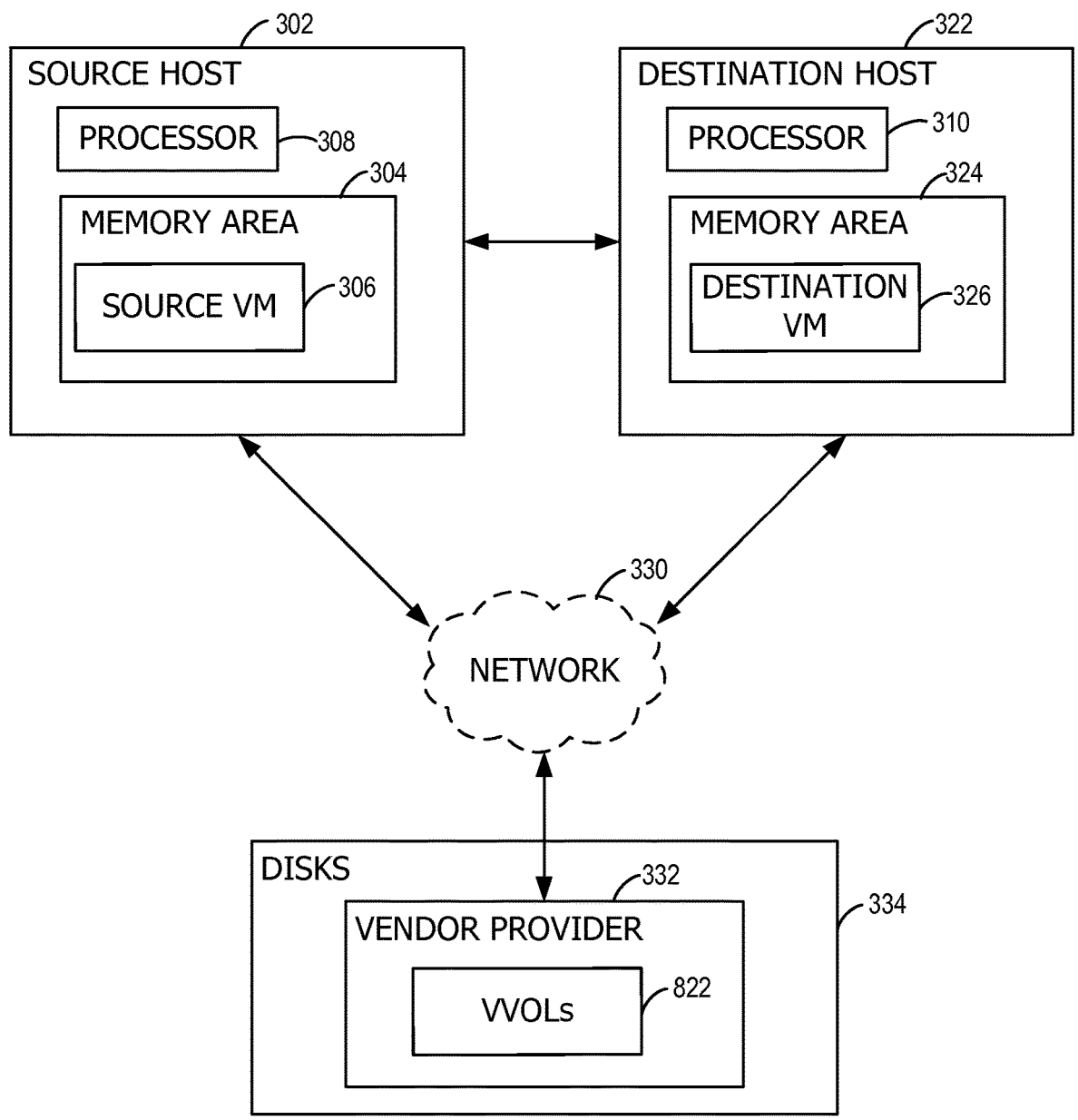
FIG. 3 is a block diagram of an example system architecture for performing encrypted live migration of a source virtual machine (VM) to a destination VM.

FIG. 3 is a block diagram of an example system architecture for performing encrypted live migration of a source VM 306 to a destination VM 326 having shared disks 334 accessible via a network 330. In some examples, the shared disks 334 are virtual volumes (VVOLs), such as VVOLs 822 managed and/or maintained by one or more vendor providers (VPs) 332, or other array providers, that allow shared access to the VVOLs 822.

In general, the system includes a source host computing device (e.g., source host 302) and a destination host computing device (e.g., destination host 322). Each host (e.g., source host 302 and destination host 322) contains, for example, a processor (e.g., processor 308 and processor 310, respectively) and a memory (e.g., memory area 304 and memory area 324, respectively). One or more VMs are contained within the memory area of each host. In the example of FIG. 3, the source VM 306 is located on the source host 302, and the destination VM 326 is located on the destination host 322. In one example, the source host 302 and destination host 322 communicate directly with each other. The source host 302 and destination host 322 also, in this example, communicate with at least one storage disk. The storage disk may be one of any number of disks that are locally or remotely accessible, including a virtual storage array, NFS, VMFS, VVOL, and vSAN. The storage disk is accessible through the network 330, in this example.

In this example, live migration is performed by one or more processors, coordinated by hypervisor 210 (shown in FIG. 2). For example, the processor 308 associated with the source VM 306 and the processor 310 associated with the destination VM 326 respond to (e.g., execute) commands issued by the hypervisor 210.

Figure 4:
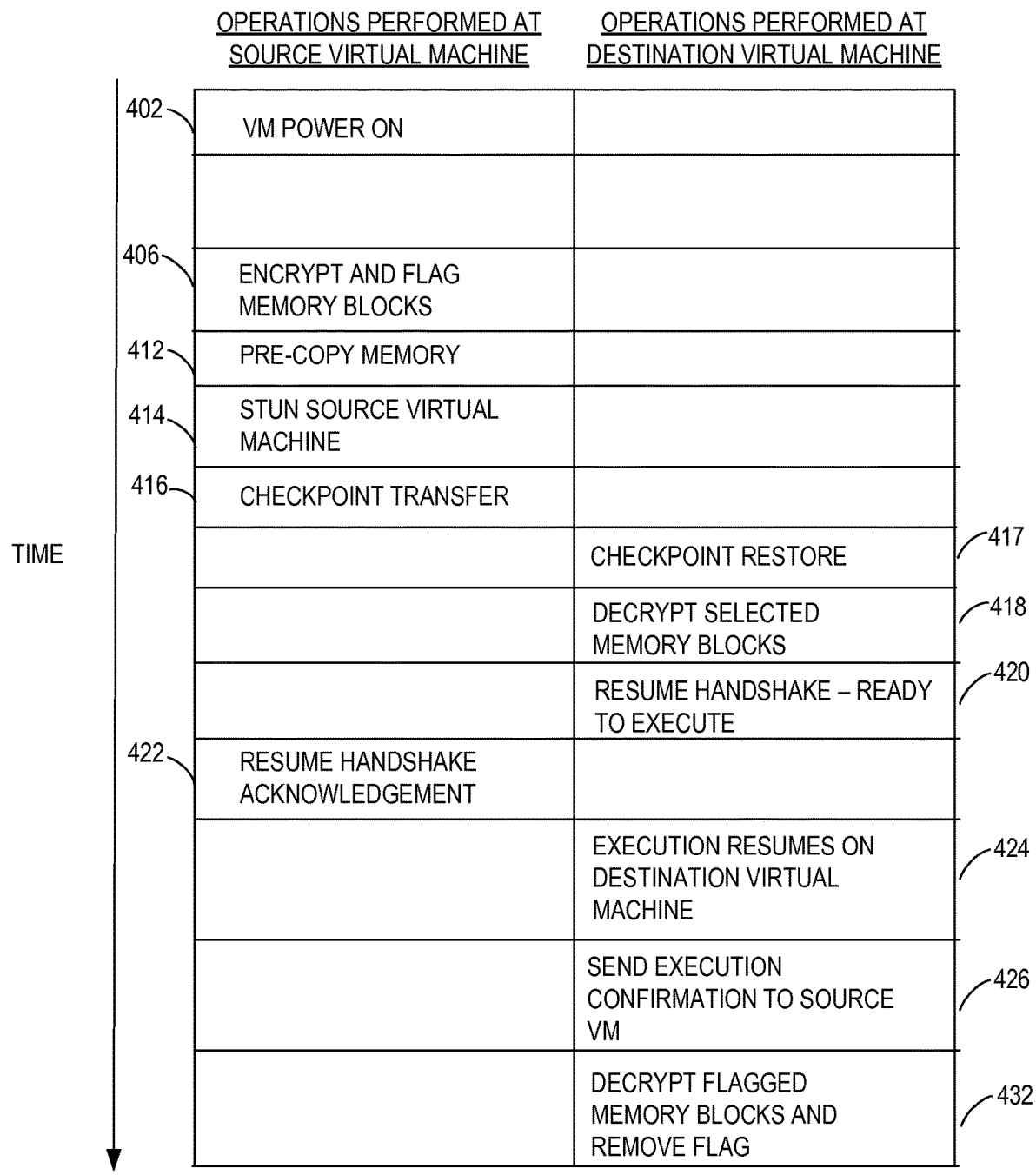
FIG. 4 is a block diagram of an example sequence for performing asynchronous encrypted live migration of a source VM to a destination VM.

FIG. 4 is an example sequence for performing asynchronous encrypted live migration as performed by the source VM 306 and/or the destination VM 326. While the example illustrated in FIG. 4 is drawn to asynchronous encrypted live migration, as performed by vMotion by VMware, Inc., it is understood that the disclosure may likewise be utilized for any method of live migration known in the art operable with the present disclosure. The source VM 306 powers on at 402. If the source VM 306 is already powered on, this step may be omitted. In some examples, the source VM 306 may be powered on by a timer or on a schedule. The schedule is established, for example, by the user, a processor of the source host 302, or a third-party transmitting instructions to the source host 302.

At 406, the source VM 306 encrypts one or more memory blocks associated with the source VM 306. In some examples, the source VM 306 flags the encrypted memory blocks to indicate that they are encrypted. Alternatively, the memory blocks are flagged as encrypted by the destination VM 326. In some examples, the memory blocks are already encrypted before live migration begins. The blocks may be encrypted at any time prior to transmission. In some examples, the encryption of the memory blocks is prioritized by frequency of use, importance to the user, or how soon after execution the destination VM 326 should anticipate using the memory block.

In other examples, the memory blocks may be encrypted with one or more parameters. The parameter may be linked to alternative encryption keys. For example, more sensitive memory blocks may be encrypted using a more sophisticated encryption key, indicated by a different parameter. Likewise, less sensitive memory blocks may be encrypted using less sophisticated encryption keys, tied to a second parameter. In some examples the parameters may be nested, with layers of encryption, for instance, on the same memory blocks (e.g., encrypting one or more memory blocks with a first parameter, and encrypting at least some of the one or more memory blocks with a second parameter). The memory blocks may be encrypted at any time before the memory blocks are transmitted. In some examples, at least some of the memory blocks are not encrypted. Memory blocks may be marked for encryption by a user 108, or may be encrypted based on pre-determined criteria established by the hypervisor 210.

In some examples, the hash of the memory blocks is calculated, or multiple hashes are calculated for individual blocks or sets of blocks. The calculated hash is encrypted, in some examples, and transmitted to the destination VM 326. The destination VM 326 decrypts the hash. In some examples, the decrypted hash is used as a checksum. In that example, the hash of the same content (e.g. memory block or set of memory blocks) is calculated at the destination VM 326 and compared to the hash transmitted by the source VM 306. In other examples the decrypted hash is used as an additional layer of encryption.

In other examples, parameters are utilized to check for corruption in the transmitted data. For example, the set of metadata transmitted by the source VM 306 would allow validation of a larger set of pages to make sure things do not get corrupted during transmission. The larger set of pages is encrypted using a first parameter, or migration key. A checksum, or "here are pages I think I sent", is encrypted with a new migration key (e.g., the new migration key is the second parameter, where the original migration key is the first parameter). The metadata is encrypted specific to the second migration command (using the second parameter) to allow the destination VM 326 to ensure that what was expected to have been received was actually received. In some examples more than two parameters are utilized. In some examples, the metadata is encrypted in some manner specific to the second migration (e.g., using the second parameter), and not tied to the first migration (e.g., which used the first parameter) to prevent replay attacks.

The source VM 306 pre-copies its memory to the destination VM 326 at 412. This may take anywhere from seconds to hours. In some examples, one or more memory encrypted memory blocks are transferred to the destination VM 326. Pre-copying is complete when the memory at the destination VM 326 is approximately the same as the memory at the source VM 306. In some examples, encryption occurs immediately before the pre-copying in this operation. In some examples the destination VM 326 flags any encrypted memory blocks as they are received. In other examples, encrypted memory blocks are already flagged by the source VM 306 before they are transmitted to the destination VM 326.

Although represented as pre-copying, any form of memory copy is contemplated. The disclosure is not limited to pre-copy. Once the memory has been pre-copied or copied from the source VM at 412, the source VM 306 is stunned at 414. Stunning freezes or otherwise suspends execution of the source VM 306, in contrast to quiescing the source VM 306. That is, in some examples, no cleanup or shutdown operations normally associated with quiescing are performed.

Once stunned, the virtual device state of the source VM 306 is serialized for transmission to the destination VM 326 as part of a checkpoint transfer at 416. Serializing the virtual device state of the source VM 306 on the source host 302 includes, in some examples, closing disks 334 (e.g., VM file systems, logical unit numbers, etc.) and/or releasing exclusive disk locks in embodiments where live migration utilized shared disks. In some examples, the disk locks were already downgraded to permit access by the destination VM 326. If the disk locks were already downgraded, releasing exclusive disk locks includes, for example, the source VM 306 relinquishing control of the status of the disk locks, removing the source VM 306 from the list of permitted users, or otherwise preventing the source VM 306 from accessing the disks. The virtual device state includes, for example, memory, queued input/output, the state of one or more virtual devices of the VM, and any other virtual device side memory. There is no need to close any disks 334 during this operation since they have already been closed, or the source VM 306 has otherwise been prevented from modifying the disks. The transmissions made in this operation may also be encrypted, in some examples. For example, the queued input/output of the source VM 306 may be encrypted.

Upon receipt of the information in the checkpoint transfer, the destination VM 326 engages in a checkpoint restore at 417. For example, if live migration utilized shared disks, the destination VM 326 restores the virtual device state of the source VM 306 at the destination VM 326 after the VPs 332 indicate that control of the disks 334 have shifted to the destination VM 326.

At 418 the destination VM 326 selectively decrypts one or more selected memory blocks. Although this operation is illustrated as occurring after the checkpoint restore, decryption may occur in any order and, in at least some examples, enables rapid encrypted live migration. In some examples, some decryption may be required before or during the checkpoint restore. For example, the virtual device state of the source VM 306 may be encrypted. In that example, the virtual device state would be decrypted before, or during, the checkpoint restore operation as necessary to complete the checkpoint restore operation. If memory blocks are required for the checkpoint restore which have not been decrypted or transferred, a fault is returned and those blocks are promptly transferred and/or decrypted. In some examples, at least some memory block decryption operations are not selected for decryption and, thus, are not decrypted at 418.

In some examples, the destination VM 326 then transmits an explicit message to the source VM 306 that the destination VM 326 is ready to start executing at 420. Some examples contemplate a one-way message sent from the destination VM 326 to the source VM 306 informing the source VM 306 that the destination VM 326 is ready to execute. This one-way message in vMotion is sometimes referred to as part of a Resume Handshake. The source VM 306, in this example, replies with a message that the destination VM 326 is allowed to execute at 422, or otherwise confirms receipt of the message from the destination VM 326. In yet another example, a processor (e.g., processor 102) queries and updates both the source VM 306 and the destination VM 326 for status reports regarding the checkpoint transmission and restoration.

After receiving the Resume Handshake acknowledgement from the source VM 306, the destination VM 326 begins and/or resumes executing at 424. In some examples, after the start of execution, the destination VM 326 sends a confirmation to the source VM 306 that execution has begun successfully at 426.

At 432 the destination VM 326 decrypts one or more remaining flagged memory blocks (e.g., memory blocks that were not decrypted at 418). Although this operation is again illustrated as occurring in a specific order, it may occur at any time in the live migration process. In some example, the only decryption which is required to occur before this point is the decryption of memory blocks necessary to execute the destination VM 326 at 424. In other examples, decryption may occur only using idle processing resources, on demand, or at a specific rate. As memory blocks are decrypted, the flags are removed from the memory blocks. Decryption of memory blocks occurs both opportunistically and on-demand, at the same time, in parallel, or simultaneously. Priority is given to on-demand decryption in some examples, but available resources are used for opportunistic decryption. Opportunistic decryption uses idle CPU resources to decrypt blocks before the VM attempts to access such blocks.

In this example, hypervisor 210 coordinates the operations for the live migration between the source VM 306 and the destination VM 326, and each VM executes the appropriate commands locally. For example, in FIG. 4, the source VM 306 encrypts and flags the encrypted memory blocks at 406, and the destination VM 326 decrypts the memory blocks at 432. Hypervisor 210 coordinates these commands, ensuring that the source VM 306 and destination VM 326 execute their respective commands in the appropriate sequence.

Figure 5A:
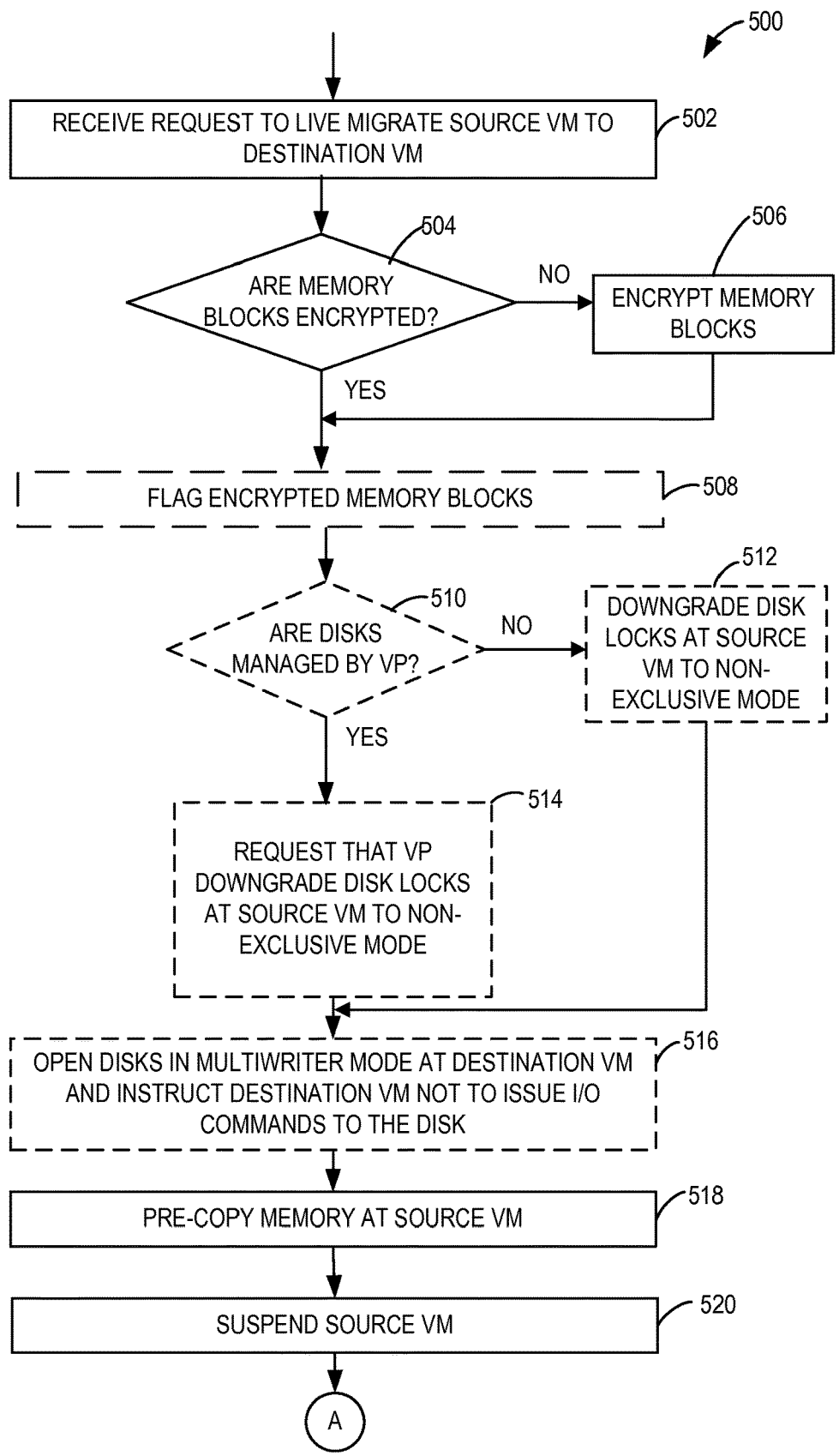
FIGS. 5A and 5B are flowcharts of an example method of migrating a source VM to a destination VM.
Figure 5B:
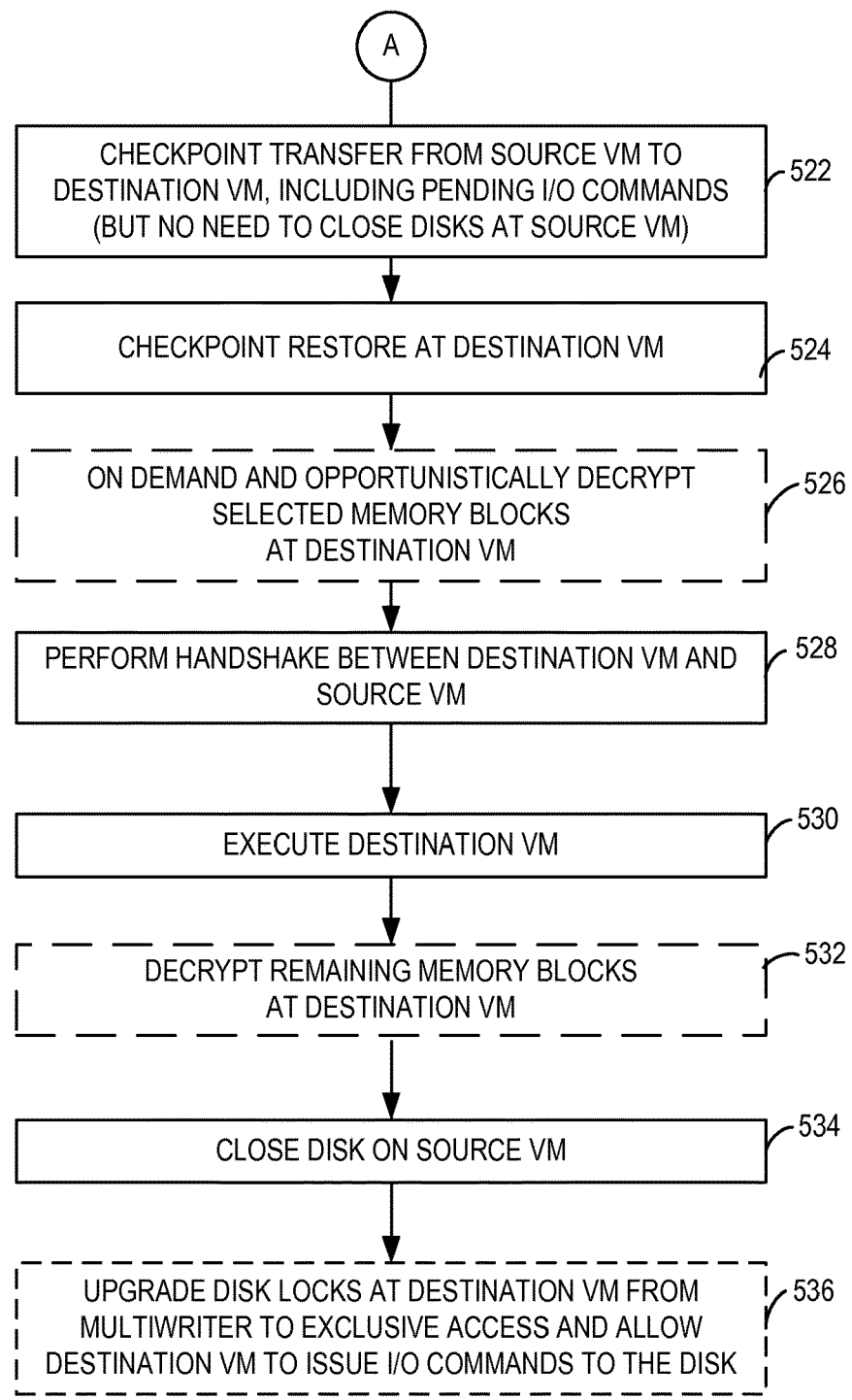

FIGS. 5A and 5B are flowcharts of an example method 500 of asynchronously migrating the source VM 306 to the destination VM 326. While method 500 is described with reference to execution by the processor 102, it is contemplated that method 500 is performed by any computing device. In one example, hypervisor 210 directs the execution of commands by the processors on the source VM 306 and the destination VM 326. Further, execution of the operations illustrated in FIGS. 5A and 5B is not limited to a VM environment, but is applicable to any multi-source, multi-destination environment. Also, while some examples are drawn to migration of a single VM from a source host to a destination host, it is understood that the method may likewise be utilized for migration of multiple VMs. Also, one or more computer-readable storage media storing computer-executable instructions may execute to cause a processor to implement the live migration by performing the operations illustrated in FIGS. 5A and 5B.

The operations of the method 500 of FIGS. 5A and 5B are carried out by the source VM 306 and the destination VM 326 working in conjunction with hypervisor 210. FIGS. 5A and 5B illustrate the example method from the point of view of hypervisor 210.

FIGS. 5A and 5B illustrate an example of asynchronous encrypted live migration of a VM from the source host 302 to the destination host 322. The hypervisor 210 coordinates the commands to the source VM 306 and/or the destination VM 326 during the asynchronous encrypted live migration. This asynchronous encrypted live migration begins after receipt of a trigger, condition, or other event at 502. For example, the event includes a request by a user for live migration of a VM from the source host 302 to the destination host 322. In other examples, the event is unplanned. For example, the event may be the source VM 306 or source host 302 reaching some operational threshold, such as the source VM 306 beginning to exceed the resources of the source host 302 or a designated quantity of users. The source VM 306 is then desired to be migrated to the destination host 322 with higher performance capabilities. As further examples, the source VM 306 may be live migrated for backup purposes, or to make it more accessible to different users. The event may also be pre-programmed, such as a timed switchover between systems or a timed backup.

After receipt of the triggering event, an encryption status of the memory blocks of the source VM 306 is evaluated at 504. At 506, unencrypted memory blocks are encrypted by the source VM 306. In some examples, all of the memory blocks are encrypted by the source VM 306. Alternatively, memory blocks are encrypted based on some criteria. In some examples, the user defines the criteria. For example, memory blocks containing protected information such as user names, passwords, account numbers, or software keys are encrypted while other information such as profile settings might remain unencrypted.

At 508, encrypted memory blocks are optionally flagged by the source VM 306. Flagging a memory block indicates to the destination VM 326 that the memory block is encrypted. In some examples, the encrypted memory blocks are flagged by the destination VM 326 upon determining the memory blocks are encrypted, to mark them for opportunistic or on-demand decryption. Flagging of memory blocks at the source VM 306 shifts encryption/decryption resources to the transmission path, which is less resource intensive than flagging memory blocks on the receipt path.

The placement of operations illustrated in FIG. 5A for operations 504, 506, and 508 is not obligatory. As long as those operations are performed before the affected memory blocks are either pre-copied to the destination VM 326 at 518, or transferred as part of the checkpoint at 522, they may be performed at any point in the sequence. In some examples, encryption may be performed at multiple times during the sequence. For example, encryption may occur before method 500 begins, and at several points before operations 518 and 522.

In FIGS. 5A and 5B, the asynchronous encrypted live migration illustrated is performed using shared disks. Live migration using share disks one example of live migration which may be encrypted and decrypted asynchronously. However, all references to disk locks are only one example of live migration, and are not obligatory. In response to the triggering event, at 512 the hypervisor 210 directs the source VM 306 to downgrade the locks on the disks 334 that are utilized by the source VM 306. In some examples, this entails changing the locks from an exclusive mode to a non-exclusive mode. In another example, downgrading the locks entails the source VMs 306 indicating to the disks 334 that the destination VM 326 is an authorized user. In another example, there may be no locks on the disks 334. In the event that the disks 334 are not locked (or have no locks), the sequence continues as illustrated in FIG. 5A. In some examples of VVOLs, downgrading of locks of the disks 334 entails communicating with the VP 332 to determine whether the disks 334 are managed by the VP 332, at 510. In the event that the disks 334 are managed by the VP 332, the source VM 306 may request that the VP 332 downgrade the locks to non-exclusive mode at 514.

Following the downgrade of the locks of the disks 334, the hypervisor 210 instructs the destination VM 326 to open the disks 334 in non-exclusive mode at 516. In one example, hypervisor 210 additionally instructs the destination VM 326 not to write and/or issue I/O commands to the disks 334 at 516. At this point, the source VM 306 is still executing, and little interruption of service, if any, is apparent to any user 108.

In one example, with the disks 334 open in a non-exclusive mode, the destination host 322 and/or the destination VM 326 are now allowed to pre-copy the memory of the disks 334 at 518. In this example, the hypervisor 210 instructs the destination VM 326 to pre-copy the disks 334. If the source VM 306 did not flag the encrypted memory blocks, the destination VM 326 flags the encrypted memory blocks.

At 520, the hypervisor 210 instructs the source VM 306 to suspend execution of the source VM 306. This is also referred to as "stunning" the source VM 306. The suspension of the source VM 306 is initiated in any of a number of ways.

For example, the destination VM 326 communicates to the hypervisor 210 that it has completed opening the disks 334, and the hypervisor 210 signals to the source VM 306 to suspend execution. Alternatively, the source VM 306 is suspended after pre-copy completes, or after a pre-determined duration of time. For example, after the source VM 306 downgrades the locks at 512 of the disks 334, the source VM 306 sets a timer to suspension based on historic migration times, the average time for migration of disks 334 of the relevant size, a time specified by the user, and/or a time related to a processing speed of the VP 332 hosting the disks 334. In some examples, the time between downgrading the disks 334 and suspending the source VM 306 may also be dependent on the bandwidth of the network 330, network congestion, and/or other fabric-related limitations such as link limitations, path length, logical unit number (LUN) limitations, etc.

After suspending the source VM 306, at 522 the state of the source VM 306, or its "checkpoint", is transferred from the source host 302 to the destination host 322. In some examples, the virtual device state of the source VM 306 is encrypted. In one example, the disks 334 are closed by the source VM 306 at this point. The transfer of the state of the source VM 306 is unnoticeable by at least some users, in some examples. To effectuate the transfer, relevant information regarding the source VM 306 may be transmitted to the destination VM 326, or hypervisor 210 specifies relevant information to transfer. This transfer includes, for example, I/O commands that have not yet been executed by the source VM 306, applications running on the source VMs 306, appropriate encryption/decryption data from the source VM 306, information regarding authorized users, cached data, or any other information associated with the source VM 306. In other examples, the appropriate encryption/decryption data from the source VM 306 is transferred to the destination VM 326 by another server.

After the source host 302 has transmitted the checkpoint of the source VM 306 to the destination host 322, at 522, the destination host 322 restores the checkpoint of the destination VM 326 at 524. It is unnecessary to open the disks 334 at the destination VM 326 at this point, because the disks 334 were previously opened at the destination VM 326. In some examples, restoring the checkpoint of the destination VM 326 occurs before all blocks are transferred, or before all blocks are decrypted. As the destination VM 326 requests a block which is either not transferred or not decrypted, a fault is returned and that block is requested or decrypted. On-demand and opportunistic decryption of the encrypted memory blocks occurs simultaneously, or in parallel.

After the checkpoint restore is complete, selected memory blocks may be decrypted at 526 at the destination VM 326, and, in at least some example, memory blocks that are not selected are not decrypted. This operation is optional, but may be required for continued operation of the destination VM 326. For example, as described above, as memory blocks are required for continued execution of the destination VM 326, those memory blocks are decrypted. This is an example of "on-demand" decryption. Likewise, memory blocks are opportunistically decrypted, using available resources. Memory blocks are decrypted opportunistically and on-demand simultaneously or in parallel. In some examples, as decryption occurs, any flags indicating an encrypted status are removed from the now-decrypted memory blocks.

In some examples, after performing the checkpoint restore, a one-way message is sent from the destination VM 326 to the source VM 306 informing the source VM 306 that the destination VM 326 is ready to execute at 528. This one-way message in vMotion is sometimes referred to as a Resume Handshake. The source VM 306 may also send a message to the destination VM 326 confirming receipt of the message from the destination VM 326. In yet another example, hypervisor 210 queries both the source and the destination VMs for status reports regarding the checkpoint transmission and restoration, and updates each VM.

With the checkpoint of the VM restored at the destination host 322, at 530 the host executes the destination VM 326. In some examples, the destination VM 326 is an exact copy of the source VM 306. However, in other examples the destination VM 326 does not execute every application of the source VM 306. For example, the user may selectively designate whether one or more applications running on the source VM 306 is or is not executed on the destination VM 326, or the source VM 306 earmarks applications that are specific to the source host 302 and are not executed by the destination VM 326 on the destination host 322.

At 532 the destination VM 326 optionally decrypts the remaining encrypted or flagged memory blocks (e.g., memory blocks that were not decrypted at 526). In some examples, not all of the flagged memory blocks are decrypted before closing the disk of the source VM 306. Although decryption is illustrated as a discrete operation, it may occur asynchronously, continuously, intermittently, on demand, or in any fashion which maximizes processing efficiency and user experience at the destination host. For example, the flagged or encrypted blocks may be decrypted in order of priority as established by the source VM 306. The priority of decryption may be based on frequency of use, in some examples, on order of use, or on number of users requesting the memory blocks. Further methods and examples of asynchronous decryption are described below with reference to FIG. 7.

With the migrated VM running on the destination host 322, the source VM 306 closes the disks 334 at 534. In another example, the disk may have been closed when the VM checkpoint was transferred from the source host 302 to the destination host 322. Alternatively, the source VM 306 closes the disks 334 after receiving the Resume Handshake from the destination VM 326, or upon direction by hypervisor 210. In another example, the source VM 306 closes the disks 334 after an allotted amount of time has passed. The allotted amount of time may be designated, for instance, by the user, by the processor 102, or by the VP 332. In yet another example, the allotted amount of time is calculated by historical averages, by algorithms, or by any other process known in the art.

With the destination host 322 running the destination VM 326 and after the source VM 306 closes the disks, the destination VM 326 upgrades the disk locks from multi-writer mode to exclusive mode at 536. In the example where the hypervisor 210 directed the destination VM 326 not to write to the disks 334, the hypervisor 210 now allows the destination VM 326 to write to the disks 334. In the example where the disks 334 did not contain locks, it is unnecessary to change the access of the disks 334.

In an example, the destination VM 326 is not permitted to issue I/O commands to the disks 334 while the source VM 306 has the disks 334 open. In this example, the hypervisor 210 indicates to the destination VM 326 when it is allowed to write to the disks 334. In an alternative example, the source VM 306 itself sends a signal to the destination VM 326 after it has closed the disks 334. Other methods are contemplated, such as the destination VM 326 querying the disks 334 to determine whether the source VM 306 still has the disks 334 open, or the destination VM 326 querying the disks 334 for the status of the write mode of the disks 334.

Figure 6:
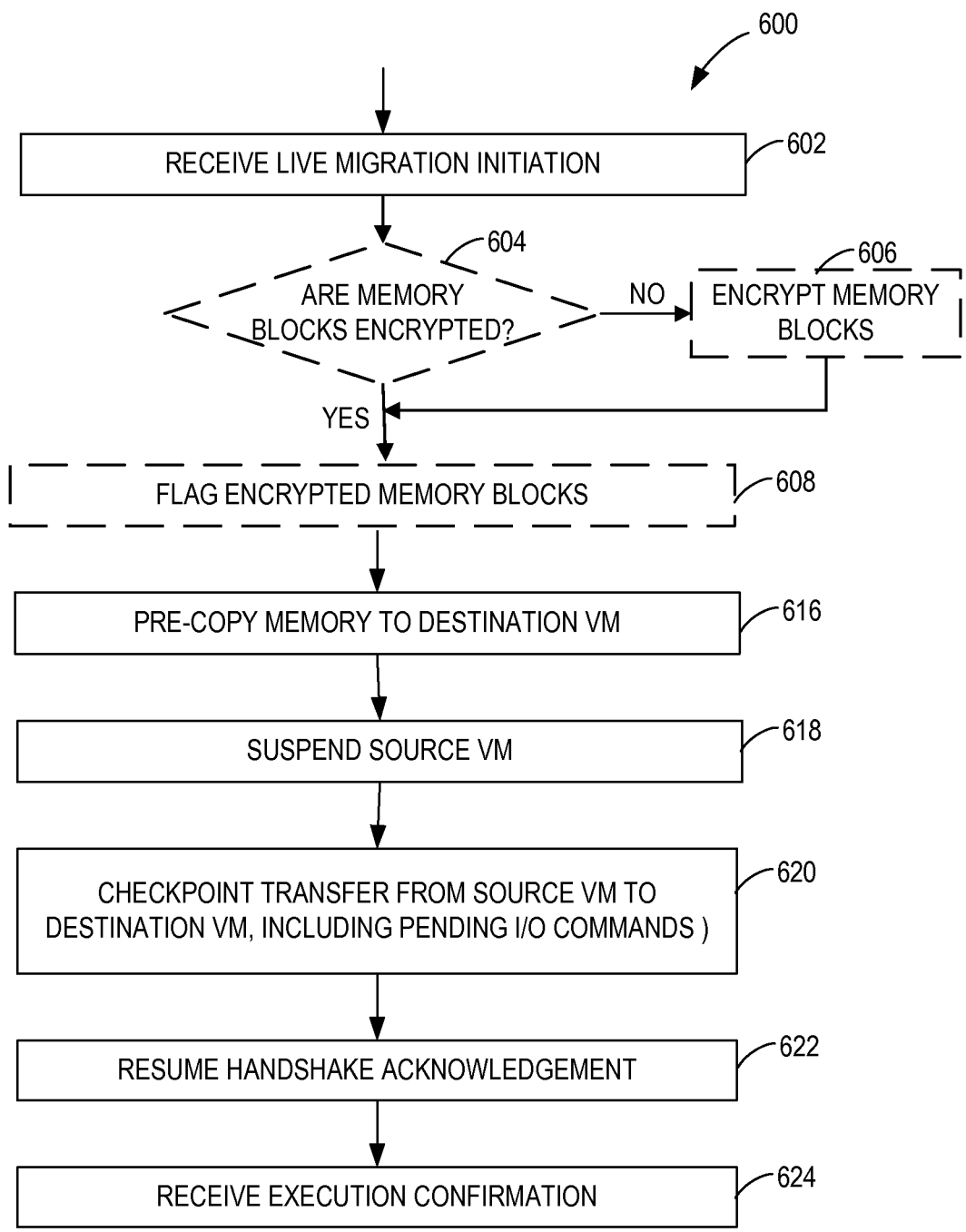
FIG. 6 is a flowchart of an example method of migrating a source VM to a destination VM from the perspective of a source host computing device.

FIG. 6 is a flowchart of an example method 600 of asynchronous encrypted live migration of a VM from the source VM 306 to the destination VM 326, as performed by the source VM 306. While method 600 is described with reference to execution by the processor 308 contained on the source host 302, shown in FIG. 3, it is contemplated that method 600 may be performed by any computing device. Further, execution of the operations illustrated in FIG. 6 is not limited to a virtualized environment, but is applicable to any multi-source, multi-destination environment. Additionally, while some examples are drawn to migration of a single VM from a source host to a destination host, it is understood that the method is likewise utilized for migration of multiple VMs. Also, one or more computer-readable storage media storing computer-executable instructions may execute to cause a processor to implement the live migration by performing the operations illustrated in FIG. 6.

The operations of the example method 600 of FIG. 6 are carried out by the processor 308 associated with the source VM 306. The hypervisor 210 coordinates the operations carried out by the processor 308 associated with the source host 302 and the processor 310 associated with the destination host 322.

In FIG. 6, the source VM 306 receives a command to begin asynchronous encrypted live migration at 602. This command is initiated, for example, from the hypervisor 210, from a user 108, or may be triggered by an event occurring at the source VM 306. Triggering events are described above with reference to FIG. 5A.

After receipt of the triggering event, the source VM 206 optionally determines whether one or more blocks 606 are encrypted at 604, and encrypts memory blocks at 606 that are unencrypted. Alternatively, the memory blocks may already be encrypted at before method 600 begins. The source VM 306 need not encrypt all memory blocks. The encrypted memory blocks, in some examples, are flagged by the source VM 306 at 608. Although encryptions and flagging are illustrated as occurring immediately after the live migration triggering event, encryption of memory blocks may occur at any time leading up to transmission to the destination host 322, including immediately before transmission to the destination host 322.

The memory of the source VM 306 is pre-copied to the destination VM 326 at 616. This may be accomplished in several ways. For example, the hypervisor 210 instructs the destination VM 326 to pre-copy the memory of the disks 334 from the source VM 306. Alternatively, the source VM 306 initiates the pre-copy by transmitting its memory. Additionally, the hypervisor 210 may coordinate the pre-copying of the memory of the source VM 306. In some examples, the memory of the source VM 306 is pre-copied utilizing shared disks, as illustrated in FIGS. 5A and 5B.

At 618, the source VM 306 is "stunned", or otherwise suspends execution. The suspension of the source VM 306 may be initiated in a number of ways. For example, the destination VM 326 communicates to the hypervisor 210 that it has completed opening the disks 334, and the hypervisor 210 signals to the source VM 306 to suspend execution. Alternatively, the source VM 306 suspends after a pre-determined duration of time. After suspending the source VM 306, at 620 the virtual device state of the source VM 306, or its "checkpoint", is transferred from the source host 302 to the destination host 322. The virtual device state of the source VM 306 is, in some examples, encrypted.

In some examples, the source VM 306 receives a one-way message sent from the destination VM 326 informing the source VM 306 that the destination VM 326 is ready to execute at 622 (e.g., a Resume Handshake acknowledgement). In some examples, the source VM 306 confirms receipt of the one-way message. In some examples, the source VM 306 receives notification that the destination VM 326 is executing at 624.

Figure 7:
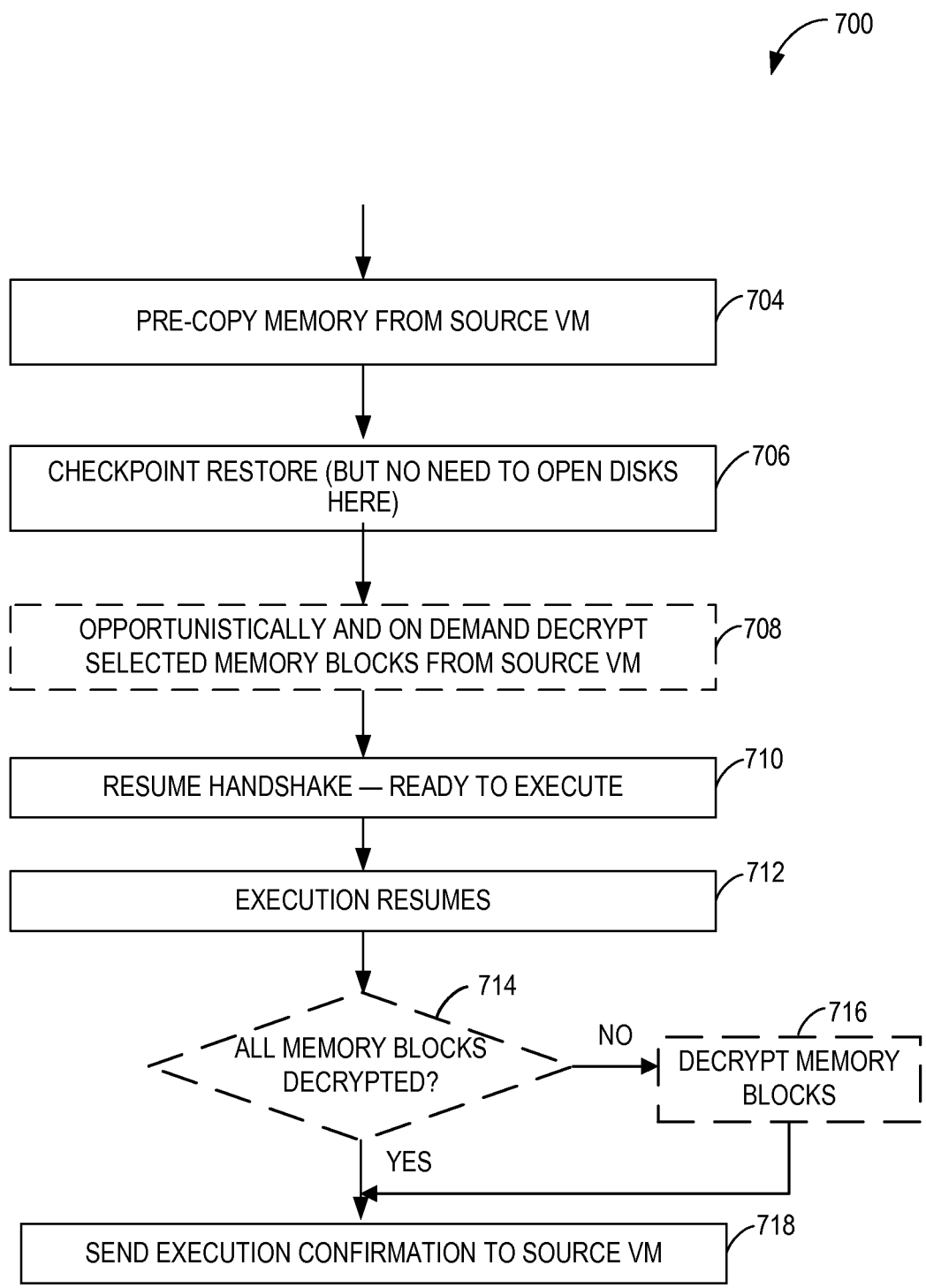
FIG. 7 is a flowchart of an example method of migrating a source VM to a destination VM from the perspective of a destination host computing device.

FIG. 7 is a flowchart of an example method 700 of asynchronous encrypted live migration of a VM from the source VM 306 to the destination VM 326 from the perspective of the destination VM 326. While method 700 is described with reference to execution by the processor 310, shown on the destination host 322 on a system such as shown in FIG. 3, it is contemplated that method 700 may be performed by any computing device. Further, execution of the operations illustrated in FIG. 7 is not limited to a virtualized environment, but is applicable to any multi-source, multi-destination environment. Also, while the claim language is drawn to migration of a single VM from a source host 302 to a destination host 322, it is understood that the method may likewise be utilized for migration of multiple VMs. Also, one or more computer-readable storage media storing computer-executable instructions may execute to cause a processor to implement the live migration by performing the operations illustrated in FIG. 7. Likewise, while FIG. 7 is drawn to live migration performed by vMotion by VMware, Inc., it is understood that the disclosed method of asynchronous encrypted live migration is operable with any method of live migration known in the art.

The example operations of FIG. 7 are carried out by the destination VM 326, and the destination VM 326 works in conjunction with the hypervisor 210 and the source VM 306.

At 704 the destination VM 326 is allowed, enabled, and/or configured to pre-copy the memory of the disks 334. In this example, the hypervisor 210 instructs the destination VM 326 to pre-copy the memory of the disks 334 at 704. In some examples the destination VM 326 flags any encrypted blocks it receives. In other example, the source VM 306 has already flagged the encrypted blocks. Once the destination VM 326 has finished the pre-copy, the source VM 306 is suspended. The destination VM 326, in some examples, receives notification that the source VM 306 has been stunned. This notification may be received from the hypervisor 210, or from the source VM 306 itself.

At 706 the destination VM 326 optionally begins decrypting memory blocks received from the source VM 306. In some examples, the destination VM 326 decrypts only the memory blocks necessary to execute the transferred VM. In other examples, the destination VM 326 decrypts memory blocks on demand. Alternatively the destination VM 326 decrypts memory blocks utilizing only idle processing capabilities. The destination VM 326 may also decrypt memory blocks according to other criteria such as frequency of use. As the destination VM 326 decrypts memory blocks, the destination VM 326 removes any flag indicating the block is no longer encrypted.

After suspending the source VM 306, the state of the source VM 306, or its "checkpoint", is transferred from the source host 302 to the destination host 322. The destination VM 326 receives the checkpoint data and applies it to restore itself to reflect the transmitted checkpoint of the source VM 306 at 708. To effectuate such a transfer, relevant information regarding the source VM 306 is transmitted to the destination VM 326 (or hypervisor 210, in another example, specifies relevant information). The destination VM 326 receives, for example, I/O commands that have not yet been executed by the source VMs 306, applications running on the source VMs 306, appropriate encryption/decryption data from the source VMs 306, information regarding authorized users, cached data, or any other information associated with the source VMs 306. The checkpoint data is encrypted, in some examples.

After applying the checkpoint data, in some examples, a one-way message is sent from the destination VM 326 to the source VM 306 informing the source VM 306 that the destination VM 326 is ready to execute at 710. In other examples, the source VM 306 sends a message to the destination VM 326 confirming receipt of the message from the destination VM 326. In yet another example, the hypervisor 210 queries both the source and the destination VMs for status reports regarding the checkpoint transmission and restoration, and exchanges that information with the VMs.

Those skilled in the art will note that the destination VM 326 utilizes the checkpoint information transmitted from the source host 302 to duplicate the source VM 306. In some examples, the destination VM 326 is an exact copy of the source VM 306. However, in other examples the destination VM 326 does not execute every application of the source VM 306. For example, the user may designate applications running on the source VM 306 which need not be executed on the destination VM 326, or the source VM 306 may earmark applications that are specific to the source host 302 and are not executed by the destination VM 326 on the destination host 322.

In some examples, at 714 the destination VM 326 evaluates whether all encrypted or flagged memory blocks have been decrypted. If one or more memory blocks are still encrypted, the destination VM 326 optionally decrypts and de-flags them at 716. While these operations are illustrated as occurring after execution, they are asynchronous and can occur at any time after transmission of the memory blocks from the source VM 306 to the destination VM 326. The decryption operations may occur during a plurality of phases. In some examples the user 108 or the processor 310 controls various aspects of the phases of decryption, and those aspects may vary between phases. For instance, the user 108 may alter the rate of decryption, the order of decryption, or the processing resources devoted to decryption. In some examples, memory blocks are decrypted only upon request. For instance, an application requires a set of memory blocks for execution, and those memory blocks are selectively decrypted.

In some examples, the encrypted memory blocks are decrypted at a predetermined rate. The rate may be controlled by processing resources, anticipated need for various memory blocks, user 108 requests, or other criteria. The decryption criteria may also include decryption under a priority system. Memory blocks may, for example, be prioritized for decryption by the user 108, the hypervisor 210, or the processor 310. Memory blocks with a higher priority would be decrypted first, and memory blocks with the second highest priority would be decrypted second until each memory block is decrypted.

In other examples decryption occurs in accordance with the pattern of encryption. As the processor 310 of the destination VM 326 receives and evaluates the memory blocks the processor 310 looks for patterns in encryption. For example, a pattern of encryption indicates the priority of encrypted blocks, anticipated order of use of encrypted blocks, underlying organization of encrypted blocks, etc. The pattern of encryption is, in some examples, application-specific, user-specific, or based on some other criteria. In that example, the processor 310 decrypts the memory blocks in accordance with the established pattern.

Memory blocks are also, in some examples, decrypted in accordance with parameters marked on them by the source VM 306. For instance, the parameters may indicate that one or more encryption codes were used.

With the checkpoint of the VM restored at the destination VM 326, at 712 the destination host 322 executes the destination VM 326. In some examples, the execution of the destination VM 326 occurs upon receipt of notification that the source VM 306 has terminated execution of the source VM 306. This notification comes, for example, from hypervisor 210, or from the source VM 306 itself.

Following execution of the destination VM 326, the destination VM 326, in some examples, notifies the source VM 306 that the destination VM 326 is executing at 718. In examples where hypervisor 210 directed the destination VM 326 not to write to the disks 334, hypervisor 210 now allows the destination VM 326 to write to the disks 334. In an additional example where the disks 334 did not contain locks, it is unnecessary to change the access of the disks 334.

ADDITIONAL EXAMPLES

In other examples, the disclosed method is used during suspend/resume operations. In those examples, the current state of the source VM 306 is suspended. Suspending the source VM 306, in some examples, includes encrypting memory blocks. In that example, when the VM is resumed (e.g., as the destination VM 326), the memory blocks are decrypted on-demand or opportunistically, as described above. The decryption operations are performed in parallel.

EXEMPLARY OPERATING ENVIRONMENT

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

The examples illustrated and described herein as well as examples not specifically described herein but within the scope of aspects of the invention constitute exemplary means for implementing live migration using shared disk locks. For example, the elements illustrated in the figures, such as when encoded to perform the operations illustrated in the figures, constitute exemplary means for receiving a request to perform a live migration of a source VM on a source host to a destination VM on a destination host, exemplary means for downgrading locks on disks of the source VM from an exclusive mode to a non-exclusive mode in response to the received request, exemplary means for opening the disks on the destination VM in non-exclusive mode, exemplary means for pre-copying memory on the source VM, exemplary means for suspending execution of the source VM, exemplary means for transferring virtual memory of the source VM to the destination VM, exemplary means for executing the destination VM, exemplary means for closing the disks on the source VM, and exemplary means for upgrading the locks on the destination VM from the non-exclusive mode to the exclusive mode.

Some examples are described herein with reference to virtual volumes (VVOLs). According to some examples, a storage system cluster creates and exposes VVOLs to connected computer systems. Applications (e.g., VMs accessing their virtual disks, etc.) running in computer systems access the VVOLs on demand using standard protocols, such as SCSI (small computer simple interface) and NFS (network file system) through logical endpoints for the SCSI or NFS protocol traffic, known as "protocol endpoints" (PEs), that are configured in storage systems.

While some of the examples are described with reference to VVOLs offered by VMware, Inc., aspects of the disclosure are operable with any form, type, origin, or provider of virtual volumes.

Alternatively or in addition to the other examples described herein, examples include any combination of the following:
pre-copying memory from the source VM to the destination VM after downgrading the lock
restoring the virtual device state on the destination VM before executing the destination VM
the destination VM issues input/output (I/O) commands to the disk only after closing the disk on the source VM
suspending execution of the source VM occurs after a pre-defined duration of time has elapsed since the destination VM opened the disk in the non-exclusive mode
opening the disk on the destination VM in the non-exclusive mode comprises communicating with a vendor provider managing the disk
commands to the source VM while it is stunned are transmitted to the destination VM for execution after the live migration.

Alternatively or in addition to the other examples described herein, examples include any combination of the following performed by the source VM (e.g., source VM 306):
receive a request to perform a live migration of the source VM to a destination VM, and downgrading comprises downgrading the locks in response to the received request
suspend execution of the source VM after a pre-defined duration of time has elapsed since the destination VM opened the disks in the non-exclusive mode
send a message to the destination VM, after downgrading the locks, that multiwriter mode is available for the disks
calculate the time involved for live migration from the source VM to the destination
VM
commence the process of live migration after a trigger.
Alternatively or in addition to the other examples described herein, examples include any combination of the following performed by the destination VM (e.g., destination VM 326):
the one or more disks are selected from a group consisting of a virtual volume, a virtual storage array, and a virtual storage area network
open the one or more disks on the destination VM in a multiwriter lock mode.
restore the virtual device state of the source VM on the destination VM
issue input/output (I/O) commands to the disks only after the source VM closes the disks
execute the destination VM in response to receiving an acknowledgment from the source VM that execution of the source VM is terminating.

Certain embodiments as described above relate to live migration of a virtual machine from a first host to a second host. It should be noted that such live migration may also be applied to other data objects such as containers, one example of which is a Docker container (see, e.g., www.docker.com). Containers implement operating system-level virtualization, wherein an abstraction layer is provided on top of the kernel of an operating system on a host computer. The abstraction layer supports multiple containers each including an application and its dependencies. Each container runs as an isolated process in userspace on the operating system and shares the kernel with other containers. The container relies on the kernel's functionality to make use of resource isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system comprising:
a memory area associated with a computing device, said memory area storing memory blocks; and
a processor programmed to:
encrypt, at a first host, one or more memory blocks associated with a source virtual machine (VM);
transfer the one or more encrypted memory blocks to one or more second hosts; and
decrypt, at the one or more second hosts, only those memory blocks of the one or more encrypted memory blocks needed to execute a destination VM at the one or more second hosts.

2. The system of claim 1, wherein the processor is programmed to:
receive a request associated with one or more first memory blocks of the one or more encrypted memory blocks; and
selectively decrypt, at the one or more second hosts, the one or more first memory blocks after receiving the request during a first phase of a plurality of phases.

3. The system of claim 2, wherein the processor is programmed to decrypt, at the one or more second hosts, one or more second memory blocks of the one or more encrypted memory blocks at a predetermined rate during a second phase of the plurality of phases.

4. The system of claim 1, wherein the processor is further programmed to decrypt, at the one or more second hosts, remaining encrypted memory blocks of the one or more encrypted memory blocks on-demand or opportunistically after completion of the decryption of the memory blocks needed to execute the destination VM at one or more second hosts.

5. The system of claim 1, wherein the processor is programmed to:
identify one or more first memory blocks of the one or more memory blocks associated with a first priority of a plurality of priorities;
identify one or more second memory blocks of the one or more memory blocks associated with a second priority of the plurality of priorities;
wherein the first priority is different from the second priority;
decrypt, at the one or more second hosts, the one or more first memory blocks associated with the first priority before the one or more second memory blocks associated with the second priority are decrypted.

6. The system of claim 1, wherein the processor is programmed to:
associate the one or more memory blocks with a flag after encrypting the one or more memory blocks; and
disassociate the one or more memory blocks from the flag after decrypting the one or more encrypted memory blocks.

7. The system of claim 1, wherein the processor is further programmed to:
determine whether one or more first memory blocks of the one or more memory blocks are encrypted with a first parameter; and
when the one or more first memory blocks are determined to be encrypted with the first parameter, encrypt, at the first host, the one or more first encrypted memory blocks with a second parameter.

8. The system of claim 1, wherein the processor is further programmed to:
calculate one or more hashes of the memory blocks;
encrypt the one or more calculated hashes;
transfer the one or more encrypted hashes to one or more destination hosts; and
decrypt the one or more hashes at the one or more destination hosts.

9. A method for encrypting memory blocks, said method comprising:
encrypting one or more memory blocks associated with a source host with a first parameter;
transferring the one or more encrypted memory blocks to one or more destination hosts; and
decrypting only those memory blocks of the one or more encrypted memory blocks that are required to perform a checkpoint restore operation of a source virtual machine at the one or more destination hosts.

10. The method of claim 9, further comprising:
identifying one or more first memory blocks of the one or more memory blocks associated with a first priority of a plurality of priorities;

identifying one or more second memory blocks of the one or more memory blocks associated with a second priority of the plurality of priorities, wherein the first priority is different from the second priority, wherein decrypting the one or more encrypted memory blocks comprises decrypting the one or more first memory blocks associated with the first priority, and decrypting the one or more second memory blocks associated with the second priority after the one or more first memory blocks are decrypted.

11. The method of claim 9, further comprising identifying a pattern associated with the encryption of the one or more memory blocks, wherein decrypting the one or more encrypted memory blocks comprises decrypting the one or more encrypted memory blocks based on the pattern.

12. The method of claim 9, further comprising determining whether one or more first memory blocks of the one or more memory blocks are encrypted with a second parameter, wherein encrypting one or more memory blocks comprises, when the one or more first memory blocks are determined to be encrypted with the second parameter, encrypting the one or more first encrypted memory blocks with the first parameter, such that the encryption with the first parameter and the encryption with the second parameter are nested.

13. The method of claim 9, further comprising receiving a request associated with one or more first memory blocks of the one or more encrypted memory blocks, wherein decrypting the one or more encrypted memory blocks comprises selectively decrypting the one or more first memory blocks after receiving the request during a first phase of a plurality of phases.

14. The method of claim 13, wherein decrypting the one or more encrypted memory blocks comprises decrypting one or more second memory blocks of the one or more encrypted memory blocks at a predetermined rate during a second phase of the plurality of phases.

15. The method of claim 9, wherein transferring the one or more memory blocks further comprises:
optionally downgrading locks on one or more disks of a source host from an exclusive mode to a non-exclusive mode, wherein a destination hosts opens the disks in non-exclusive mode while the source host is executing;
suspending execution of the source host; transferring virtual memory of the source host to the destination host, wherein the destination host begins execution after restoration of the virtual memory at the destination host; and
optionally closing the disks on the source host, wherein the destination host upgrades the locks from the non-exclusive mode to the exclusive mode.

16. The method of claim 9, wherein performing a checkpoint restore operation of a source virtual machine at the one or more destination hosts comprises restoring a virtual device state of the source host at the one or more destination hosts.

17. One or more non-transitory computer-readable storage media including computer-executable instructions that, when executed, cause at least one processor to:
encrypt, at a first host, one or more memory blocks associated with a first parameter;
transfer the one or more encrypted memory blocks to one or more destination hosts; and
decrypt, at one or more second hosts, only those memory blocks of the one or more encrypted memory blocks that are required to perform a checkpoint restore operation of a source virtual machine at the one or more second hosts.

18. The one or more non-transitory computer-readable storage media of claim 17, wherein the computer-executable instructions, when executed, cause at least one processor to:
receive a request associated with one or more first memory blocks of the one or more encrypted memory blocks;
selectively decrypt, at the one or more second hosts, the one or more first memory blocks after receiving the request during a first phase of a plurality of phases; and
decrypt, at the one or more second hosts, one or more second memory blocks of the one or more encrypted memory blocks at a predetermined rate during a second phase of the plurality of phases.

19. The one or more non-transitory computer-readable storage media of claim 17, wherein the computer-executable instructions, when executed, cause at least one processor to:
identify one or more first memory blocks of the one or more memory blocks associated with a first priority of a plurality of priorities;
identify one or more second memory blocks of the one or more memory blocks associated with a second priority of the plurality of priorities;
wherein the first priority is different from the second priority; and
decrypt, at the one or more second hosts, the one or more first memory blocks associated with the first priority before the one or more second memory blocks associated with the second priority are decrypted.

20. The one or more non-transitory computer-readable storage media of claim 17, wherein the computer-executable instructions, when executed, cause at least one processor to:
determine whether one or more first memory blocks of the one or more memory blocks are encrypted with a second parameter before the one or more first memory blocks are encrypted with the first parameter; and
when the one or more first memory blocks are determined to be encrypted with the second parameter, encrypt the one or more first encrypted memory blocks with the first parameter, such that the encryption with the first parameter and the encryption with the second parameter are nested.

* * * * *